(12) United States Patent
Yuan et al.

(10) Patent No.: US 8,804,641 B2
(45) Date of Patent: Aug. 12, 2014

(54) METHOD AND DEVICE FOR DETECTING DOWNLINK CONTROL INFORMATION

(75) Inventors: Ming Yuan, Shenzhen (CN); Feng Bi, Shenzhen (CN); Feng Liang, Shenzhen (CN); Jin Yang, Shenzhen (CN); Shuanshuan Wu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 113 days.

(21) Appl. No.: 13/260,255

(22) PCT Filed: Aug. 25, 2010

(86) PCT No.: PCT/CN2010/076355
§ 371 (c)(1),
(2), (4) Date: Nov. 29, 2011

(87) PCT Pub. No.: WO2011/035675
PCT Pub. Date: Mar. 31, 2011

(65) Prior Publication Data
US 2012/0093063 A1 Apr. 19, 2012

(30) Foreign Application Priority Data
Sep. 25, 2009 (CN) .......................... 2009 1 0177845

(51) Int. Cl.
*H04W 72/04* (2009.01)
*H04W 48/12* (2009.01)
*H04W 84/04* (2009.01)

(52) U.S. Cl.
CPC ............ *H04W 72/042* (2013.01); *H04W 48/12* (2013.01); *H04W 84/047* (2013.01)
USPC ........................................................ 370/329

(58) Field of Classification Search
CPC .. H04W 48/12; H04W 72/042; H04W 84/047

USPC ......... 370/203, 208, 315, 319, 328, 329, 343, 370/344
See application file for complete search history.

(56) References Cited

U.S. PATENT DOCUMENTS

| 2009/0097433 A1 | 4/2009 | Shen et al. |
| 2009/0181693 A1 | 7/2009 | So et al. |

(Continued)

FOREIGN PATENT DOCUMENTS

| CN | 101064547 A | 10/2007 |
| CN | 101420702 A | 4/2009 |

(Continued)

OTHER PUBLICATIONS

Nokia, "Further Aspects of Control Channel for Relay Backhaul link", Jul. 3, 2008, 3GPP TSG RAN WG1, Meeting #57bis, R1-092565.*
International Search Report dated Dec. 2, 2010 in application PCT/CN2010/076355.

(Continued)

*Primary Examiner* — Paul H Masur
(74) *Attorney, Agent, or Firm* — Foley & Lardner LLP

(57) ABSTRACT

A method and a device for detecting downlink control information. The method includes: a Relay Node (RN) receiving control information born in a Relay Physical Downlink Control Channel (R-PDCCH) sent by an evolved Node B (eNB) to acquire a control resource; the RN performing detection on the control resource according to an index of the control resource to acquire own control information; wherein the control resource is a Relay Control Channel Element (R-CCE) or a Physical Resource Block (PRB). System overhead can be saved and system transmission efficiency can be improved.

14 Claims, 3 Drawing Sheets

(56) References Cited

U.S. PATENT DOCUMENTS

| | | | |
|---|---|---|---|
| 2010/0275083 A1* | 10/2010 | Nam et al. | 714/748 |
| 2010/0281323 A1* | 11/2010 | Wang et al. | 714/748 |
| 2011/0103292 A1* | 5/2011 | Pasad et al. | 370/315 |

FOREIGN PATENT DOCUMENTS

| | | |
|---|---|---|
| CN | 101527916 A | 9/2009 |
| JP | 2010-541367 A | 12/2010 |
| WO | WO-2009/041779 A1 | 4/2009 |

OTHER PUBLICATIONS

"DL Backhaul Physical Channel Design for Type I Relay", Samsung, 3GPP TSG RAN WG1, Meeting #58, R1-093384, Aug. 2009, pp. 2-5.

"Further Aspects of Control Channel for Relay Backhaul Link", Nokia Siemens Networks, Nokia, 3GPP TSG RAN WG1, Meeting #57bis, R1-092565 (2009), pp. 2-4.

"On Multiplexing of Data and Control Signaling on Backhaul", Nokia Siemens Network, Nokia, 3GPP TSG RAN WG1, Meeting #58, R1-093313, Aug. 2009, pp. 2-4.

"Type 1 Backhaul Link", Ericsson, NEC, Samsung, Motorola, Panasonic, RIM, LGE, Nokia, Nokia Siemens Networks, Qualcomm, Huawei, Alcatel-Lucent, CATT, Texas Instruments, ZTE, Potevio, ST-Ericsson, 3GPP TSG RAN WG1, Meeting #57bis, R1-092969, 2009.

"3rd Generation Partnership Project; Technical Specification Group Radio Access Network; Evolved Universal Terrestrial Radio Access (E-utra); Physical layer Procedures (Release 8)", 3GPP TS 36.213, V8.7.0, May 2009, pp. 2-6.

* cited by examiner

METHOD AND DEVICE FOR DETECTING DOWNLINK CONTROL INFORMATION

TECHNICAL FIELD

The present invention relates to the field of mobile communication, and in particularly, to a method and device for detecting downlink control information.

BACKGROUND OF THE RELATED ART

The future wireless communication or cellular system is required to increase the coverage range and to support higher speed transmission, which presents new challenges to the wireless communication technique. Meanwhile, the issue of system construction and maintenance expenses is even more prominent. With the increase of the transmission rate and communication distance, the battery energy consumption issue has also become prominent, and the future wireless communication will use higher frequencies, which results in more severe path loss attenuation. In order to increase the high data rate, group mobility and coverage range of the temporary network deployment, to improve cell edge throughput, and to provide services for users within the coverage holes of the cellular system, the wireless communication system introduces the Relay technique, and therefore, the relay technique is considered as a crucial technique of the 4G.

In the Long Term Evolution (LTE) communication system, a Physical Downlink Control Channel (PDCCH) is designed to be composed of a plurality of different components, and each component has its own specific functions. A plurality of terms and conventions is defined in the following for a convenience of description:

1. Resource Element (RE): the minimum time and frequency resource block, which occupies 1 subcarrier in 1 Orthogonal Frequency Division Multiplexing (OFDM) symbol.

2. Resource Element Group (REG): 1 REG can be composed of 4 or 6 REs according to different positions of the reference symbol in each OFDM symbol.

3. Control Channel Element (CCE): the CCE is composed of 36 REs, 9 REGs, and the CCE comprises information such as: the user's downlink scheduling grant information (DL grant) and the uplink scheduling grant information (UL grant), as well as information related to the system information (SI), random access (RA) response and paging.

4. Physical Resource Block (PRB): 1 continuous slot in the time domain, and 12 consecutive sub-carriers in the frequency domain.

5. PRB pair: 1 continuous subframe in the time domain, and 12 consecutive sub-carriers in the frequency domain.

6. Aggregation level L: a combination format of CCEs, that is, the PDCCH can only be composed of L CCEs, where L ∈ {1,2,4,8}. That is to say that the PDCCH only is composed of the combination of 1 CCE (denoted by 1-CCE), the combination of 2 CCEs (denoted by 2-CCE), the combination of 4 CCEs (denoted by 4-CCE) or the combination of 8 CCEs (denoted by 8-CCE), and these 4 different combinations further correspond to 4 different coding rates, that is, the coding rate of the 1-CCE is ⅔, the coding rate of the 2-CCE is ⅓, the coding rate of the 4-CCE is ⅙, and the coding rate of the 8-CCE is ¹⁄₁₂.

7. Search Space (SS): the search space is composed of a plurality of candidate control channel groups, and the UE monitors the search space and blindly detects the downlink control channel related to this search space in the search space.

8. Two types of search spaces: one is the UE-common Search Space that all the UEs must monitor, and it bears common information related to the SI, RA response and paging; the other is the UE-specific Search Space, which bears the respective uplink and downlink scheduling grant information of UE.

9. Different CCE aggregation levels have the corresponding number of candidate control channels, namely the maximum times of blind detections. For example, in the UE-specific Search Space: the number of candidate control channels of the 1-CCE is 6, that is, the times of blind detection according to 1 CCE as a group are no more than 6; the number of candidate control channels of the 2-CCE is 6, that is, the times of blind detection according to 2 CCEs as a group is no more than 6; the number of candidate control channels of the 4-CCE is 2, that is, the times of blind detection according to 4 CCEs as a group is no more than 2; and the number of candidate control channels of the 8-CCE is 2, that is, the times of blind detection according to 8 CCEs as a group is no more than 2. In the UE-common Search Space: the number of candidate control channels of the 4-CCE is 4, that is, the times of blind detection according to 4 CCEs as a group is no more than 4; and the number of candidate control channels of the 8-CCE is 2, that is, the times of blind detection according to 8 CCEs as a group is no more than 2.

The detailed process of the UE performing blind detection on the PDCCH in the LTE system is:

at the eNB side (where eNB is also called as the E-UTRAN NodeB, where the E-UTRAN is the Evolved Universal Terrestrial Radio Access Network), step 1: channel coding is performed on control information born in the PDCCH of each UE respectively;

step 2: the coded control information born in the PDCCHs of all the UEs is cascaded, and is scrambled with a cell-specific sequence;

step 3: Quadrature Phase Shift Keying (QPSK) modulation is performed to acquire a string of CCEs corresponding to the control information born in all the PDCCHs at this time, and the CCEs are numbered from 0; it is assumed that the PDCCH at this time is composed of 32 CCEs in total, that is, they are numbered as CCE 0, CCE 1, . . . , CCE 31:

step 4: The above string of CCEs is interleaved by taking the REG as the unit and then mapped to the RE;

step 5: the CCEs are transmitted after performing the Inverse Fast Fourier Transform (IFFT).

At the UE side, step 1: the receiving end acquires a string of CCEs with the same numbers with those at the eNB side after performing Fast Fourier Transform (FFT) and de-interleaving;

step 2: the UE starts to the blind detection from the combination of 1-CCE, first calculates the starting position of the 1-CCE based on parameters such as the UE identity (ID), subframe number and so on, that is, the blind detection is start from the CCE with which number, and then determines the search space according to the number of candidate control channels. For example, the starting position of the 1-CCE is CCE 5, and then the search space of the UE is {CCE 5, CCE 6, CCE 7, CCE 8, CCE 9, CCE 10}. In other words, UE should perform the blind detection on [CCE 5, CCE 6, CCE 7, CCE 8, CCE 9, CCE 10] respectively.

Step 3: if the UE does not detect a UE ID matched itself when performing blind detection in accordance with the combination of 1-CCE, it starts to perform blind detection form the combination of the 2-CCE. First, the starting position of the 2-CCE is still calculated according to parameters such as its UE-ID, subframe number and so on, and then the search space is determined according to the number of candidate control channels. For example, the starting position of the 2-CCE is CCE 10, and then the search space of the UE is {[CCE 10 CCE 11], [CCE 12 CCE 13], ..., [CCE 20 CCE 21]}. In other words, the UE should perform blind detection on [CCE 10 CCE 11], [CCE 12 CCE 13], ..., [CCE 20 CCE 21] respectively, and so on.

Step 4: if the UE does not monitor the UE ID matched with itself in the whole blind detection process, it means there is on no control signaling to be sent to this UE, and the UE switches to sleep mode; if the UE monitors the UE ID matched with itself, it demodulates the corresponding service information in accordance with the instructions in the control signaling.

In the mobile communication system with relay nodes, as shown in FIG. 1, the link between the eNB and the RN is called as a Backhaul Link, the link between the RN and a user under its coverage range is called as an Access Link, and the link between the eNB and the UE under its coverage range is called as a Direct Link. For the eNB, the RN is equivalent to UE; and for the UE, the RN is equivalent to an eNB.

The inband relay means both the backhaul link and the access link use the same frequency band, and therefore when applying the inband relay, the RN cannot perform sending and receiving operations simultaneously in the same frequency resource in order to avoid its own sending and receiving interference. When the RN sends the downlink control information to UE which belongs to this RN, it cannot receive the downlink control information sent from the eNB. Therefore, the RN first sends the downlink control information to UE which belongs to this RN in the previous one or two OFDM symbols during the downlink transmission, then switches from transmission to reception in a certain period, and after completing the switching, receives the data from the eNB in the subsequent OFDM symbols, wherein the data include the Relay Physical Downlink Control Channel (R-PDCCH) and the Relay Physical Downlink Shared Channel (R-PDSCH), as shown in FIG. 2, namely the downlink control channel sent by the eNB to the RN is born in the Physical Resource Block (PRB).

The eNB sends the downlink control information via the R-PDCCH (the PDCCH of the Relay), and the control information born in the R-PDCCH includes information such as the uplink/downlink scheduling grant of the RN and so on. In the downlink backhaul subframe, the eNB semi-statically reserves a plurality of PRBs for the R-PDCCH transmission, as shown in FIG. 3. In the downlink backhaul subframe, the eNB semi-statically reserves a plurality of PRB pairs for the R-PDCCH transmission. Wherein, the PDCCH of the Rel-8 UE is transmitted on the previous n (n≤3) symbols in the $1^{st}$ slot, the downlink scheduling grant information (DL grant) of the RN is transmitted on the rest symbols in the $1^{st}$ slot except the symbol occupied by the PDCCH, and the uplink scheduling grant information (UL grant) of the RN is transmitted on the $2^{nd}$ slot.

At present, the research on the R-PDCCH in the research on the Relay is always a hot spot. For the R-PDCCH detection problem, the 3rd Generation Partnership Project (3GPP( ) only has a RN-common SS similar to UE-common SS, however, there is no any solution for the R-PDCCH detection.

SUMMARY OF THE INVENTION

The technical problem to be solved in the present invention is to provide a method and device for detecting downlink control information to solve the problem of how relay nodes search for their own downlink control information in the LTE-A system with the relay nodes.

In order to solve the above technical problem, the present invention provides a method for detecting downlink control information, and the method comprises:

a relay node (RN) receiving downlink control information born in a relay physical downlink control channel (R-PDCCH) sent by an evolved Node B (eNB) to acquire a control resource;

wherein the control resource is born in a group of physical resource blocks (PBR) or PBR pairs semi-statically reserved by the eNB for relay, and said control resource is based on a relay control channel element (R-CCE) or an aggregation of one or more PRBs.

The control resource is the downlink control information born in the R-PDCCH;

the method also comprises: the RN performing detection on the control resource according to an index of the control resource to acquire own downlink control information.

The above method can further have following characteristics:

when the control resource is based on the R-CCE, the R-PDCCH of said RN is interleaved together, and the step of the RN receiving the downlink control information born in the R-PDCCH sent by the eNB to acquire the control resource comprises:

said RN receiving the downlink control information born in the R-PDCCH sent by the eNB on a group of PRBs or PRB pairs semi-statically reserved by the eNB for the relay, and performing Fast Fourier Transform (FFT) and de-interleaving to acquire a plurality of R-CCEs.

The above method can further have following characteristics:

when the control resource is transmitted on the aggregation of one or more PRBs, the R-PDCCHs of various RN are not interleaved with each other, and the step of the RN receiving the downlink control information born in the R-PDCCH sent by the eNB to acquire the control resource comprises:

the RN receiving the downlink control information born in the R-PDCCH sent by the eNB on one or more PRB pairs of a group of PRB pairs semi-statically reserved by the eNB for the relay.

The above method can further have following characteristics:

when the control resource is based on the R-CCE, the step of the RN performing detection on the control resource according to the index of the R-CCE to acquire own control information comprises:

said RN acquiring a RN-specific search space according to a RN identity, a subframe number of a backhaul subframe, an aggregation level of a CCE and a number of candidate control channels, wherein the RN-specific search space is denoted by a R-CCE index; and the RN performing blind detection on the R-CCEs in the RN-specific search space, and if an R-CCE matching with an own RN identity is detected, the downlink control information born in this R-CCE being RN's own control information.

The above method can further have following characteristics:

said RN-specific search space is:

$$L \cdot \{(Y_k + e) \bmod \lfloor N_{R\text{-}CCE,k}/L \rfloor\} + i$$

where, $L \in \{1,2,4,8\}$, $L \in \{1,2,4\}$, $L \in \{1,2\}$ or $L \in \{1\}$, and $i=0, \ldots, L-1$, $e=0, \ldots, E^{(L)}-1$, and $E^{(L)}$ is the number of candidate control channels, and $N_{R\text{-}CCE,k}$ is a total number of R-CCEs for relay link transmission, $Y_k = (A^* Y_{k-1}) \bmod D$, $Y_{-1} = n_{RNT1} \neq 0$, $A=39827$, $D=65537$, k is the subframe number of the backhaul subframe, and $n_{RNT1}$ is a RN identity index; the number of candidate control channels is 6, 4 or 2;

since the DL grant is mapped into a $1^{st}$ slot and the UL grout is mapped into a $2^{nd}$ slot, thus the RN respectively performs the detection on the DL grant and UL grant, namely the RN detects the DL grant in the $1^{st}$ slot and detects UL grant in a $2^{nd}$ slot; that is to say that the RN has two specific search spaces, namely a DL grant specific search space and a UL grant specific search space, at this time;

the calculation way of the DL grant specific search space and the UL grant specific search space of the RN are as the above, where, L values are same or different.

The above method can further have following characteristics:

when the control resource is transmitted on the aggregation of one or more PRBs, the step of the RN performing detection on the control resource according to the indexes of the control resource to acquire own control information comprises:

said RN acquiring a RN-specific search space according to a RN identity, a subframe number of a backhaul subframe, a aggregation level of PRBs and a number of candidate PRBs, wherein the RN-specific search space is denoted by a PRB index; and the RN performing blind detection on the PRBs in the RN-specific search space, and if a PRB matching with an own RN identity is detected, the downlink control information born in this PRB being RN's own control information.

The above method can further have following characteristics:

said RN-specific search space is:

$$n \cdot \{(Y_k+m) \mod \lfloor N_{RB}^{BL}/n \rfloor\} + i$$

where, $n \in \{1,2,4,8\}$, $n \in \{1,2,4\}$, $n \in \{1,2\}$ or $n \in \{1\}$, and $i=0, \ldots, n-1$, $m=0, \ldots, M^{(n)}-1$, and $M^{(n)}$ is the number of candidate PRBs, and $N_{RB}^{BL}$ is a total number of PRBs semi-statically reserved by the eNB for the relay, $Y_k=(A*Y_{k-1}) \mod D$, $Y_{-1}=n_{RNTI} \neq 0$, $A=39827$, $D=65537$, and k is the subframe number of the backhaul subframe; and the number of candidate PRBs is 6, 4 or 2;

the RN detects the downlink scheduling grant information (DL grant) in a $1^{st}$ slot and detects the uplink scheduling grant information (UL grant) in a $2^{nd}$ slot;

a DL grant specific search space and a UL grant specific search space of the RN are both calculated as an above formula, where, L values are same or different when calculating the DL grant specific search space and the UL grant specific search space of the RN.

When n is 2, 4 or 8, inserting a fixed integer times interval between 2 or 4 or 8 consecutive PRB indexes acquired according to the above formula to acquire inconsecutive PRBs.

The above method can further have following characteristics:

the step of the RN performing detection on the control resource according to the index of the control resource comprises:

the eNB notifying the index of the control resource of the R-PDCCH of the RN via broadcast signaling, higher layer signaling or message 2 in a random access process, and further performing detection on the control resource corresponding to the index of the control resource; and the eNB notifying respective indexes of a DL grant and a UL grant of the RN via broadcast signaling, higher layer signaling or the message 2 in the random access process, and further performing detection on the control resource corresponding to the respective indexes of the DL grant and the UL grant.

The above method can further have following characteristics:

the eNB notifies the index of the control resource of the R-PDCCH of the RN via a bitmap; or, the eNB notifies the index of the control resource of the R-PDCCH of the RN via a tree structure.

The above method can further have following characteristics:

the step of the RN performing detection on the control resource according to the index of the control resource comprises: appointing various aggregation levels between the RN and the index of the control resource via the eNB and the RN, and further performing detection on the control resource corresponding to the index of the control resource.

The above method can further have following characteristics:

the eNB notifies a change of the aggregation level between the RN and the index of the control resource via a broadcast channel of the RN.

When the control resource is based on the R-CCE, DL grants of the RN are interleaved with each other, and the UL grants of the RN are interleaved with each other;

the step of the RN receiving the downlink control information born in the R-PDCCH sent by the eNB to acquire the control resource further comprises:

the RN receiving an interleaved DL grant in a first slot of a group of PRB pairs semi-statically reserved by the eNB for the relay, performing fast Fourier transform (FFT) and de-interleaving to acquire a plurality of R-CCEs$_{DL\ grant}$;

receiving an interleaved UL grant in a second slot of a group of PRB pairs semi-statically reserved by the eNB for the relay, performing fast Fourier transform (FFT) and de-interleaving to acquire a plurality of R-CCEs$_{UL\ grant}$; and the RN performing detection on a DL grant search space and a UL grant search space respectively.

When the control resource is transmitted on the aggregation of one or more PRBs, the R-PDCCHs of various RN are not interleaved with each other, and the RN has a specific PRB, the step of the RN receiving the downlink control information born in the R-PDCCH sent by the eNB to acquire the control resource further comprises:

the RN receiving a DL grant in a first slot of one or more PRB pairs semi-statically reserved by the eNB for the relay, and receiving a UL grant in a second slot; and the RN performing detection on a DL grant search space and a UL grant search space respectively.

The DL grant search space and the UL grant search space correspond to a same aggregation level or different aggregation levels.

In order to solve the above technical problem, the present invention provides a device for detecting downlink control information, which is applied in a relay node, and the device comprises a receiving unit and a detecting unit, wherein the receiving unit is configured as: receiving control information born in a relay physical downlink control channel (R-PDCCH) sent by an evolved Node B (eNB) in a group of physical resource blocks (PRB) semi-statically reserved by the eNB for relay to acquire a control resource;

the detecting unit is configured as: performing detection on the control resource acquired by the receiving unit according to an index of the control resource to acquire downlink control information of the RN.

The receiving node is configured as: acquiring the downlink control information born in the R-PDCCH as the control resource, wherein the control resource is based on a relay control channel element (R-CCE) or an aggregation of one or more PRBs.

The above device can further have following characteristics:

the receiving unit is configured as: receiving the control information born in the R-PDCCH sent by the eNB on a group of PRBs or PRB pairs semi-statically reserved by the eNB for the relay, and performing Fast Fourier Transform (FFT) and de-interleaving to acquire a plurality of R-CCEs;

receiving an interleaved DL grant in a second slot of a group of PRB pairs semi-statically reserved by the eNB for the relay, and receiving an interleaved UL grant in a second slot.

The above device can further have following characteristics:

the receiving unit is also configured as: receiving the control information born in the R-PDCCH sent by the eNB on a group of PRBs or PRB pairs semi-statically reserved by the eNB for the relay;

receiving a DL grant in a first slot of one or more PRB pairs semi-statically reserved by the eNB for the relay, and receiving a UL grant in a second slot.

The detecting unit is configured as: acquiring a RN-specific search space according to a RN identity, a subframe number of a backhaul subframe, a aggregation level of a CCE and a number of candidate control channels, performing blind detection on the R-CCEs in the RN-specific search space, and if a R-CCE matching with an own RN identity is detected, the control information born in this R-CCE being RN's own control information;

wherein, the RN-specific search space is denoted by an R-CCE index.

The above device can further have following characteristics:

the detecting unit is configured as: respectively performing the detection on the DL grant and UL grant since the DL grant is mapped into a $1^{st}$ slot and the UL grout is mapped into a $2^{nd}$ slot, namely detecting the DL grant in the $1^{st}$ slot and detecting UL grant in a $2^{nd}$ slot; that is to say that at this time two specific search spaces are had, namely a DL grant specific search space and a UL grant specific search space, which are respectively denoted by a respective R-CCE index.

The above device can further have following characteristics:

the detecting unit is also configured as: acquiring a RN-specific search space according to a RN identity, a subframe number of a backhaul subframe, a aggregation level of PRBs and a number of candidate PRBs, performing blind detection on the PRBs in the RN-specific search space, and if a PRB matching with an own RN identity is detected, the downlink control information born in this PRB being RN's own control information;

wherein the RN-specific search space is denoted by an PRB index.

The detecting unit is configured as: respectively performing the detection on the DL grant and UL grant since the DL grant is mapped into a $1^{st}$ slot and the UL grout is mapped into a $2^{nd}$ slot, namely detecting the DL grant in the $1^{st}$ slot and detecting UL grant in a $2^{nd}$ slot; that is to say that at this time two specific search spaces are had, namely a DL grant specific search space and a UL grant specific search space, which are respectively denoted by a respective R-CCE index.

The above device can further have following characteristics:

the detecting unit is also configured as: further performing detection on the control resource corresponding to the index of the control resource according to the index of the control resource of the R-PDCCH of the RN notified by the eNB via broadcast signaling, higher layer signaling or message 2 in a random access process; and further performing detection on the control resource corresponding to respective indexes of a DL grant and a UL grant the eNB according to respective indexes of the DL grant and the UL grant of the RN notified by the eNB via broadcast signaling, higher layer signaling or the message 2 in the random access process.

The above device can further have following characteristics:

the detecting unit is also configured as: appointing various aggregation levels between the RN and the index of the control resources via the eNB and the RN, and further performing detection on the control resources corresponding to the index of the control resources.

In order to solve the above technical problem, the present invention provides an evolved Node B (eNB), which comprises a bearing module and a sending module; wherein the bearing module is configured to: bear downlink control information of a relay node (RN) in a relay physical downlink control channel (R-PDCCH), and then send the R-PDCCH to the sending module; the sending is configured to: sending the R-PDCCH to the RN as that the RN acquires a control resource and then the RN performs detection on the control resource according to an index of the control resource to acquire own control information; wherein the control resource is a Relay Control Channel Element (R-CCE) or a Physical Resource Block (PRB).

In summary, the present invention takes full use of the good channel conditions of the backhaul link and greatly simplifies the complexity of the RN performing detection on the R-PDCCH. The present invention is suitable for the RN quite well, saves the system overhead and improves the system transmission efficiency.

PREFERRED EMBODIMENTS OF THE PRESENT INVENTION

In the present invention, the RN receives the control information born in the R-PDCCH sent by the eNB to acquire a control resource; the RN detects the control resource according to an index of the control resource to acquire its own control information;

wherein the control resource is a R-CCE or PRB.

That is: the RN can perform detection on the downlink control channel based on an index of the R-CCE (an index of the control channel element of the Relay), and also can perform detection based on an index of the PRB (an index of the physical resource block).

The present invention will be illustrated in detail in combination with the figures and the specific embodiments.

Figure 1:
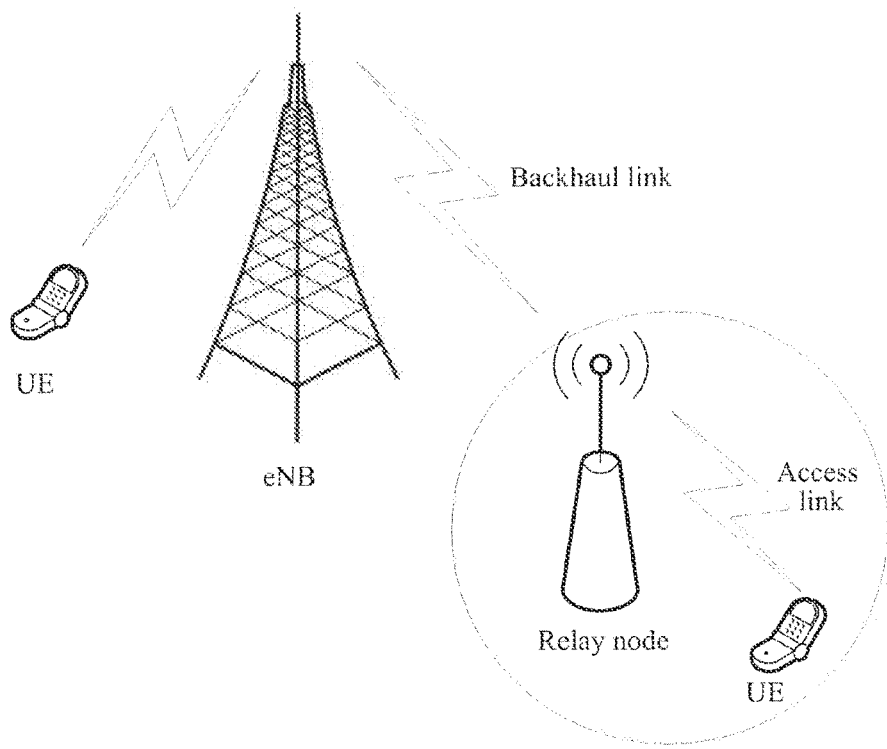
FIG. 1 is the basic system architecture after introducing the Relay.
Figure 2:
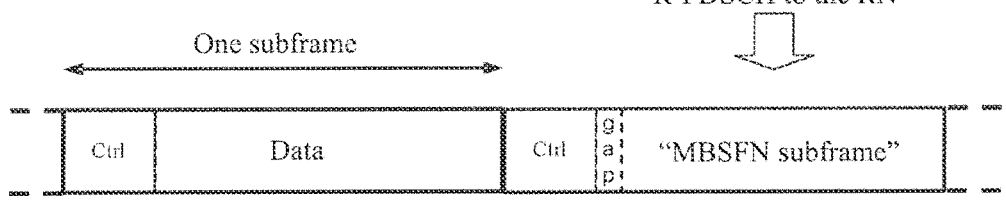
FIG. 2 is the frame structure of the downlink backhaul subframe.
Figure 3:
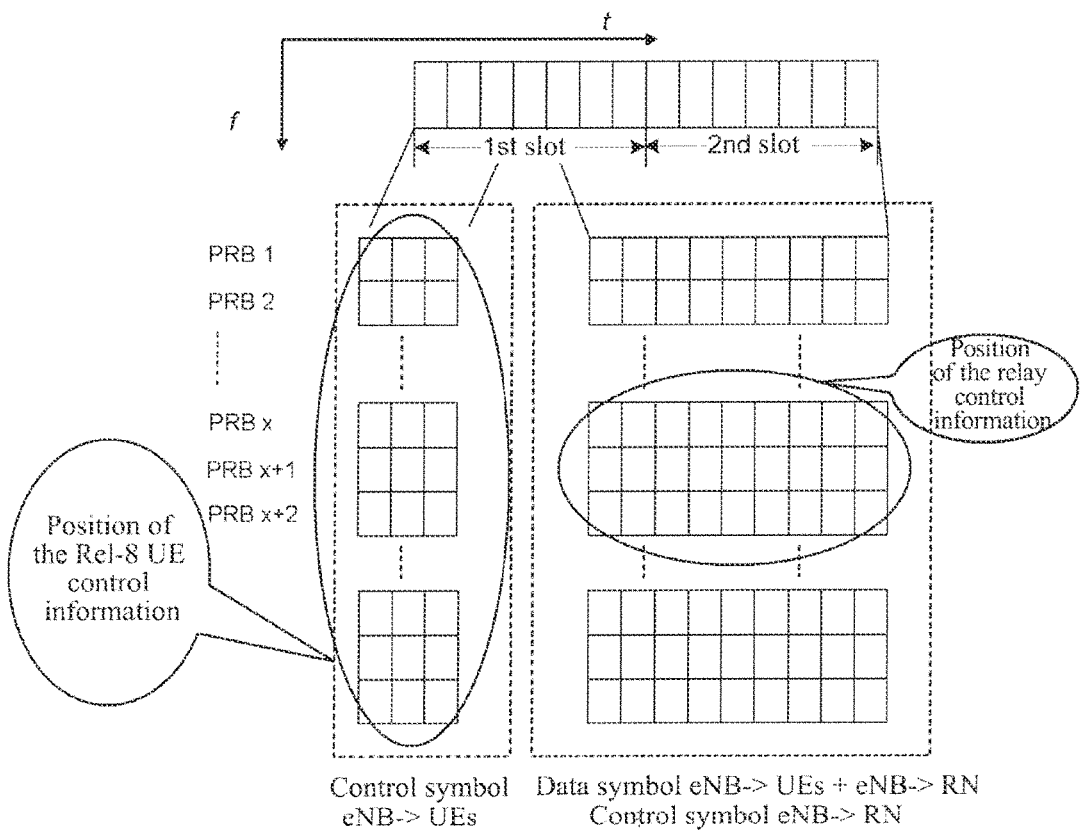
FIG. 3 is a diagram of the position relationship between the R-PDCCH and the PDCCH.
Figure 4:
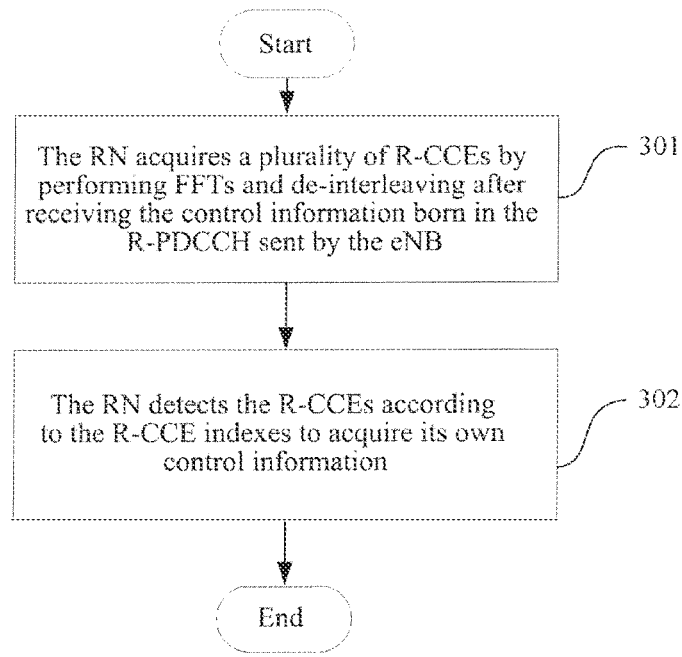
FIG. 4 is a flow chart of the method for detecting the downlink control information in accordance with the embodiment 1 of the present invention.

Embodiment 1, performing the detection on the downlink control channel based on the index of the R-CCE As shown in FIG. 4, this embodiment of the present invention comprises the following steps:

step 301, the RN receives the control information born in the R-PDCCH which is sent by the eNB on a group of PRBs which is semi-statically reserved by the eNB for the relay, and performs the FFT and de-interleaving to acquire a plurality of R-CCEs;

step 302, the RN perform detection on the R-CCEs according to the index of the R-CCE to acquire its own control information.

In this method, the control information itself of different RNs is interleaved together, but different RNs have different search space.

In this embodiment, the index of the R-CCE can be acquired by an implicit notification way or an explicit notification way:

1. the implicit notification way: using the RN ID, the subframe number of the backhaul subframe (namely the relay subframe), the aggregation level L, and the number of candidate control channels to calculate the RN-specific search spaces $S_k^{(L)}$ corresponding to different L, wherein the RN-specific search space is denoted by the index of the R-CCE; the RN blindly detecting the R-CCEs in the RN-specific search spaces, and if it detects a R-CCE matching with its own RN ID, the control information born in this R-CCE is the RN's own control information.

Furthermore, since the channel condition between the eNB and the RN is far better than the channel condition between the eNB and the UE, the above calculation method can be improved to further reduce the times of the blind detection. The parameters are as follows:

the R-PDCCH is only composed of a combination of L R-CCEs, where L∈{1, 2}. That is, the R-PDCCH is only composed of the combination of one R-CCE (denoted by 1-R-CCE) or the combination of two R-CCEs (denoted by 2-R-CCE) that respectively correspond to two higher coding rates.

The number of candidate control channels of the 1-R-CCE and that of the 2-R-CCE are both limited to 4 or 2. That is, when the RN performs the blind detection according to the 1-R-CCE and the 2-R-CCE, the times of blind detections are no more than 4 or 2.

Wherein, the RN-specific search spaces $S_k^{(L)}$ are:

$$L \cdot \{(Y_k+e) \bmod \lfloor N_{R-CCE,k}/L \rfloor\}+i$$

where, L∈{1,2}, i=0, ..., L−1, e=0, ..., $E^{(L)}$−1, $E^{(L)}$ is the number of candidate control channels, and $N_{R-CCE,k}$ is the total number of R-CCEs for backhaul link transmission allocated by the eNB, $Y_k=(A*Y_{k-1})\bmod D$, $Y_{-1}=n_{RNT1}\neq 0$, A=39827, D=65537, k is the subframe number of the backhaul subframe, and $n_{RNT1}$ is the RN ID index.

2. The Explicit notification way: fixing the index of the R-CCE bearing the R-PDCCH of each RN, and the eNB notifying the RN of the index of the R-CCE of the R-PDCCH, and the RN being not needed to perform the blind detection. This way is suitable for the condition that the number of RNs in the cell is relatively small.

Wherein, the specific way of notifying the index of the R-CCE can be:

1) explicitly notifying each RN of the respective R-CCE index by bearing the index of the R-CCE in the message 2 of the random access or the higher layer signaling. There are the following two specific ways:

(1) the bitmap way: if there are $N_{R-CCE,k}$ CCEs in the subframe k in total, it needs $N_{R-CCE,k}$ bits to notify the index of the R-CCE;

(2) The tree structure way: as the R-CCEs composing the R-PDCCH has the feature of continuity and one R-PDCCH being composed of only 1 to 2 R-CCEs, thus the tree structure can be used to further save the overhead. This way needs the eNB and the RN to appoint various combinations of the R-CCEs denoted by the used bit. If there are $N_{R-CCE,k}$ R-CCEs in the subframe k in total, it needs $\lceil \log_2(2N_{R-CCE,k}-1) \rceil$ bits;

2) semi-statically changing the above fixed R-CCE index: the eNB and the RN pre-defining a plurality of combinations between the RN and the index of the R-CCE; the eNB notifying the RN of the change of the aggregation level between the RN and the index of the R-CCE via the Relay Physical Broadcast Channel (R-PBCH) of the RN, so as to achieve the semi-static change of the index of the R-CCE.

Accordingly, the device for detecting the downlink control information in accordance with the embodiment of the present invention is applied in relay nodes, and the device comprises the receiving unit and detecting unit, wherein the receiving unit is used to receive the control information born in the R-PDCCH which is sent by the eNB on a group of PRBs which is semi-statically reserved by the eNB for the relay, perform FFT and de-interleaving to acquire a plurality of R-CCEs;

the detecting unit is used to perform the detection on the R-CCEs acquired by the receiving unit according to the index of the R-CCE to acquire the control information of the relay node.

Accordingly, an evolved Node B (eNB) comprises a bearing module and a sending module; wherein the bearing module is configured to: bear downlink control information of a relay node (RN) in a relay physical downlink control channel (R-PDCCH), and then send the R-PDCCH to the sending module; the sending is configured to: sending the R-PDCCH to the RN as that the RN acquires a control resource and then the RN performs detection on the control resource according to an index of the control resource to acquire own control information; wherein the control resource is a Relay Control Channel Element (R-CCE) or a Physical Resource Block (PRB).

Figure 5:
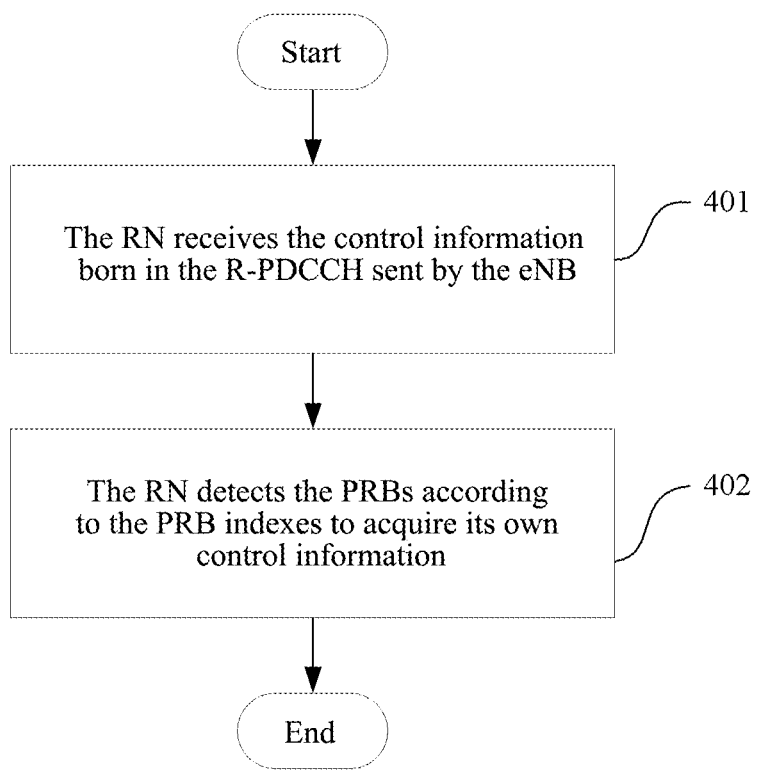
FIG. 5 is a flow chart of the method for detecting the downlink control information in accordance with the embodiment 2 of the present invention.

Embodiment 2, performing the detection on the downlink control channel based on the index of the PRB As shown in FIG. 5, this embodiment of the present invention comprises the following steps:

step 401, the RN receives the control information born in the R-PDCCH which is sent by the eNB on one or more PRBs of one group of PRBs which are semi-statically reserved by the eNB for the relay;

step 402, the RN performs detection on the PRBs according to the PRB index to acquire its own control information.

In this method, the control channel information itself of different RNs is independent and is not interleaved together, and the RN-specific search space is located in certain specific PRBs.

In this embodiment, the index of the PRB can be acquired by an implicit notification way or an explicit notification way:

1. the implicit notification way: the R-PDCCHs of different RNs having different starting PRB index, using the RN ID, the subframe number of the backhaul subframe and the aggregation level n of PRBs, as well as the number of candidate PRBs to calculate the RN-specific search spaces $S_k^{(n)}$ corresponding to different n, wherein the RN-specific search space is denoted by the index of the PRB; the RN blindly detecting the PRBs in the RN-specific search spaces $S_k^{(n)}$, if it detects a PRB matching with its own RN ID, the control information born in this PRB is the RN's own control information.

Wherein, the specific calculation way of the RN-specific search space is as follows:

the R-PDCCH is only composed of a combination of n PRBs, where n∈{1, 2}, that is, the R-PDCCH is only composed of the combination of 1 PRB (denoted by 1-PRB) or the combination of 2 PRBs (denoted by 2-PRB) that respectively correspond to two higher coding rates.

The number of candidate PRBs of the 1-PRB and that of the 2-PRB are limited to 4 or 2, that is, when the RN perform blind detection according to the 1-PRB and the 2-PRB, the times of blind detections are no more than 4 or 2.

At this time, the RN-specific search spaces $S_k^{(n)}$ are:

$$n \cdot \{(Y_k+m) \bmod \lfloor N_{RB}^{BL}/n \rfloor\} + i$$

where, $n \in \{1,2\}$, $i=0, \ldots, n-1$, $m=0, \ldots, M^{(n)}-1$, and $M^{(n)}$ is the number of candidate PRBs, and $N_{RB}^{BL}$ is the total number of a group of PRBs semi-statically reserved by the eNB for the relay, $Y_k=(A*Y_{k-1}) \bmod D$, $Y_{-1}=n_{RNT1} \neq 0$, $A=39827$, $D=65537$, k is the subframe number of the backhaul subframe.

2. The explicit notification way: fixing the index of the PRB of the PRB occupied by the R-PDCCH of each RN, and the eNB notifying the index of the PRB of the R-PDCCH of the RN.

1) Explicitly notifying the respective PRB index occupied by each RN by bearing the RPB index in which the R-PDCCH is located in the message 2 of the random access or the higher layer signaling. Similarly, the eNB can use the above bitmap and tree structure ways to notify the RN, wherein the RN does not need to perform blind detection.

2) Semi-statically changing the above fixed PRB index: the eNB and the RN pre-defining a plurality of combinations between the RN and the index of the R-CCE; the eNB notifying the RN of the change of the aggregation level between the RN and the index of the R-CCE via the Relay Physical Broadcast Channel (R-PBCH) of the RN, so as to achieve the semi-static change of the index of the R-CCE.

Embodiment 3, respectively performing the detection on the DL grant and the UL grant based on the index of the R-CCE Step 1: the RN receives the DL grant sent by the eNB in the first slot of a group of PRB pairs semi-statically reserved by the eNB for the relay and receives the UL grant sent by the eNB in the second slot, performs FFTs and de-interleaving respectively to acquire multiple R-CCEs corresponding to the DL grant, referred as R-CCE$_{DL\ grant}$, and multiple R-CCEs corresponding to the UL grant, referred as R-CCE$_{UL\ grant}$.

Step 2: the RN performs the detection on the R-CCE$_{DL\ grant}$ according to the R-CCE$_{DL\ grant}$ index to acquire the RN's own DL grant; performs the detection on the R-CCE$_{UL\ grant}$ according to the R-CCE$_{UL\ grant}$ index to acquire the RN's own UL grant.

In this method, the DL grants of different RNs are interleaved together and mapped to the first slot, and the UL grants of different RNs are interleaved together and mapped to the second slot. The DL grants and the UL grants might have the same aggregation level or different aggregation levels.

Embodiment 4, respectively performing the detection on the DL grant and the UL grant based on the index of the PRB Step 1: the RN receives the DL grant sent by the eNB in the first slot of one or more PRB pairs in a group of PRB pairs semi-statically reserved by the eNB for the relay, and receives the UL grant sent by the eNB in the second slot.

Step 2: the RN performs the detection on the DL grant and the UL grant respectively according to the PRB pair index in the first slot, referred as PRB$_{DL\ grant}$, and the PRB pair index in the second slot, referred to as PRB$_{UL\ grant}$, to acquire the RN's own DL grant and UL grant.

In this method, the DL grants of different RNs are not interleaved together but mapped to the first slot, and the UL grants of different RNs are not interleaved together but mapped to the second slot. When the DL grants and the UL grants have the same aggregation level, their search spaces are also the same; when the DL grants and the UL grants have different aggregation levels, their search spaces are also different. For example, when the n values of the aggregation levels of the DL grants and the UL grants are both n∈{1, 2, 4}, their respective corresponding search spaces are the same completely. If the n values of the aggregation levels of the DL grants are n∈{1, 2, 4}, while the n values of the aggregation levels of the UL grants are n∈{1, 2}, the DL grants has one more search space of n=4 than the UL grant has.

Accordingly, a device for detecting downlink control information in accordance with the embodiments of the present invention, which is applied in the relay nodes, comprises a receiving unit and a detecting unit, wherein the receiving unit is used to receive control information born in the R-PDCCH which is sent by the eNB to acquire control resources;

the detecting unit is used to perform the detection on the control resources acquired by the receiving unit according to the index of the control resource to acquire the control information of this relay node;

wherein the control resources are the R-CCE or the PRB.

The receiving unit is further used to receive the control information born in the R-PDCCH sent by the eNB in a group of PRBs semi-statically reserved by the eNB for the relay, perform FFT and de-interleaving to acquire a plurality of R-CCEs.

The receiving unit is further used to receive the control information born in the R-PDCCH sent by the eNB in one or more PRBs in a group of PRBs semi-statically reserved by the eNB for the relay.

The detecting unit is further used to acquire the RN-specific search space according to the RN ID, the subframe number of the backhaul subframe, the aggregation level of the R-CCEs and the number of candidate control channels, and perform blind detection on the R-CCEs in the RN-specific search space, and if it detects a R-CCE matching with its own RN ID, the control information born in this R-CCE is the RN's own control information; wherein the RN-specific search space is denoted by the index of the R-CCE.

The detecting unit is also used to acquire the RN-specific search space according to the RN ID, the subframe number of the backhaul subframe, the aggregation level of the PRBs and the number of candidate PRBs, and perform blind detection on the PRBs in the RN-specific search space, and if it detects a PRB matching with its own RN ID, the control information born in this PRB is the RN's own control information; wherein the RN-specific search space is denoted by the index of the PRB.

The detecting unit is further used to perform detection on the control resources corresponding to the control resource indexes according to the control resource indexes of the R-PDCCH of the RN notified by the eNB.

The detecting unit is further used to perform detection on the control resources corresponding to the control resource indexes according to the aggregation level between the RN and the control resource indexes appointed by the eNB and the RN.

The following application examples are used to further describe the present invention.

Application example 1: based on the index of the R-CCE, the specific detection steps when applying the implicit notification way are as follows:

Assuming: the subframe number of the backhaul subframe is the subframe #1, that is, k=1; the total number of PRBs in the 20 MHz system bandwidth is 100, in which 10 PRBs are allocated for the R-PDCCH transmission; the R-PDCCH is composed of 16 R-CCEs in total; the RN ID is B396 (hex), and the number of candidate control channels, that is, $E^{(L)}$, is 4, e=0, 1, 2, 3, and L∈{1,2}.

At the eNB side, 1) channel coding is performed on the control information born in the R-PDCCH of each RN respectively, wherein which coding rate is used specifically is determined according to the
backhaul link channel quality, for example $$\left\{\frac{2}{3}, \frac{1}{2}\right\}.$$

2) the coded control information born in the PDCCHs of all the RNs is cascaded together, and is scrambled with a cell-specific sequence;

3) the QPSK or 16QAM modulation is performed to acquire a string of R-CCEs corresponding to all the R-PDCCHs at this time, and R-CCEs are numbered, that is, R-CCE 0-R-CCE 15;

4) the above string of R-CCEs is interleaved by taking REG as the unit and then mapped to the RE corresponding to the 10 PRBs semi-statically reserved by the eNB for the delay;

5) the R-CCEs are transmitted after performing the IFFT.

At the RN side, the specific steps of the detection on the R-PDCCH are:

step 1: the receiving end receives the RE corresponding to the 10 PRBs semi-statically reserved by the eNB for the relay, and performs the FFTs and de-interleaving to acquire a same string of R-CCEs, that is, R-CCE 0-R-CCE 15, with that at the transmitting end;

step 2: the RN uses the RN ID, the subframe number of the backhaul subframe, the aggregation level L as well as the number of candidate control channels to calculate the RN-specific search spaces $S_k^{(L)}$ corresponding to different L:

the RN determines that the RN-specific search space $S_1^{(1)}$ corresponding to L=1 is:

$Y_0 = (A \cdot Y_{-1}) \bmod D = (39827 \times 45974) \bmod 65537 = 33792$ $Y_1 = (A \cdot Y_0) \bmod D = (39827 \times 33792) \bmod 65537 = 31689$ $S_1^{(1)} \in L \cdot \{(Y_k+e) \bmod \lfloor N_{R-CCE,k}/L \rfloor\} + i = \{(Y_1+e) \bmod 16\} = \{9,10,11,12\}$ the RN determines that the RN-specific search space $S_1^{(2)}$ corresponding to L=2 is:

$$S_1^{(2)} \in L \cdot \{(Y_k + e) \bmod \lfloor N_{R-CCE,k}/L \rfloor\} + i$$
$$= 2 \cdot \{(Y_1 + e) \bmod 8\} + \{0, 1\}$$
$$= \{\{2, 3\}, \{4, 5\}, \{6, 7\}, \{8, 9\}\}$$

step 3: the RN blindly detects the R-CCE 9, R-CCE 10, R-CCE 11, and R-CCE 12 in the RN-specific search space $S_1^{(1)}$ according to the case that the combination is 1 R-CCE. If there is a RN ID matching with this RN, step 5 is performed; if there is not a RN ID matching with this RN, step 4 is performed.

Step 4: the RN blindly detects [R-CCE 2, R-CCE 3], [R-CCE 4, R-CCE 5], [R-CCE 6, R-CCE 7] and [R-CCE 8, R-CCE 9] in the RN-specific search space $S_1^{(2)}$ according to the case that the combination is 2 R-CCEs. If there is a RN ID matching with this RN, step 5 is performed; if there is not a RN ID matching with this RN, it indicates that there is no downlink control information related to this RN in this subframe.

Step 5: the RN demodulates the corresponding service information according to the instructions in its own control information after acquiring the control information born in the R-PDCCH.

Application example 2: based on the index of the R-CCE, the specific detection steps when applying the explicit notification way are as follows:

At the eNB side, the eNB sets the index of the R-CCE occupied by each RN which belongs to this eNB as a fixed value, such as, the index of the R-CCE occupied by the RN1 is 2, the indexes of the R-CCEs occupied by the RN2 are 8 and 9, and so on. Besides, the indexes of R-CCE of all the RNs are not overlapped.

When the RN initially accesses the eNB, the eNB notifies the RN of the index of the R-CCE in the message 2 of the random access.

For example, a certain backhaul subframe has 16 R-CCEs in total, when applying the bitmap way, it needs 16 bits to notify the starting R-CCE index; when applying the improved tree structure way, it only needs $[\log_2(2N_{R-CCE,k}-1)] = [\log_2(2 \times 16-1)] = 5$ bits.

At the RN side, when using the bitmap way, the RN determines its own R-CCE index according to the received 16 bits bitmap pattern. For example, the index of the R-CCE occupied by the RN1 is 2, and the bitmap pattern received by the RN should be 0010000000000000; the indexes of the R-CCE occupied by the RN2 are 8 and 9, and the bitmap pattern received by the RN should be 0000000011000000.

When using the improved tree structure way, the RN can acquire which R-CCEs are occupied by its R-PDCCH specifically in accordance with the 5 bits information in the message 2 and various R-CCE aggregation levels denoted by used bits which are appointed by the RN and the eNB, such as, 10000 denoted that the index of the R-CCE occupied by said RN1 is 0, and 11100 denoted that the indexes of the R-CCE occupied by said RN1 are 6 and 7, and so on.

Application example 3: the R-PBCH is used to semi-statically notify its changes for the fixed R-CCE index.

The eNB and the RN pre-define various aggregation levels between the RN and the index of the R-CCE, such as, one aggregation level is: the index of the R-CCE of the RN1 is 1, the indexes of the R-CCE of the RN2 are 3 and 4, and the index of the R-CCE of the RN3 is 5; another aggregation level is: the indexes of the R-CCE of the RN1 are 2 and 3, the index of the R-CCE of the RN2 is 4, and the indexes of the R-CCE of the RN3 are 6 and 7; and so on.

When it needs to change the aggregation level, the eNB uses the R-PBCH to notify the RN that it changes into which aggregation level. The RN can also find its own R-CCE index according to the corresponding aggregation level.

Application example 4: based on the index of the PRB, the specific detection steps when applying the implicit notification are as follows:

Assuming: the subframe number of the backhaul subframe is the subframe #1, that is, k=1; the total number of PRBs in the 20 MHz system bandwidth is 100, in which 10 PRBs are allocated for the backhaul link transmission, that is, $N_{RB}^{BL}=10$; the RN ID is 3B50 (hex), the number m of candidate PRBs is 4, that is, m=0, 1, 2, 3, and n∈{1,2}.

At the eNB side, 1) channel coding is performed on the control information born in the R-PDCCH of each RN respectively, wherein which coding rate is used specifically is determined according to the backhaul link channel quality, for example $$\left\{\frac{3}{4}, \frac{3}{8}\right\}.$$

2) the coded control information born in the PDCCHs of each RN is scrambled with a cell-specific sequence respectively;

3) the QPSK or 16QAM modulation is then performed to acquire the separated control information born in the R-PDCCH of each RN;

4) the eNB uses the frequency-selective characteristics of the channel to map the control information born in the R-PDCCH of each RN to respective 1 or 2 PRBs with relatively good channel conditions;

5) control information is transmitted after performing the IFFT.

At the RN side, the specific steps of the detection on the R-PDCCH are:

step 1: the receiving end uses the RN ID, the subframe number of the backhaul subframe, n as well as the number of candidate PRBs to calculate the RN-specific search spaces $S_k^{(n)}$ corresponding to different n:

(1) the RN determines that the RN-specific search space $S_1^{(1)}$ corresponding to n=1 is:

$Y_0=(A \cdot Y_{-1}) \bmod D=(39827 \times 15184) \bmod 65537=23269$ $Y_1=(A \cdot Y_0) \bmod D=(39827 \times 23269) \bmod 65537=41283$ $S_1^{(1)} \in n \cdot \{(Y_k+m) \bmod \lfloor N_{RB}^{DL}/n \rfloor\}+i=\{(Y_1+m) \bmod 10\}=\{3,4,5,6\}$ (2) the RN determines that the RN-specific search space $S_1^{(2)}$ corresponding to n=2 is:

$$S_1^{(2)} \in n \cdot \{(Y_k+m) \bmod \lfloor N_{RB}^{DL}/n \rfloor\} + i$$
$$= 2 \cdot \{(Y_1+m) \bmod 5\} + \{0, 1\}$$
$$= \{\{6, 7\}, \{8, 9\}\}$$

step 2: the RN first respectively receives the PRB 3, PRB 4, PRB 5, and PRB 6 in the RN-specific search space $S_1^{(1)}$, and then performs FFTs and blind detection respectively, if there is a RN ID matching with this RN, step 5 is performed; if there is not a RN ID matching with this RN, step 4 is performed.

Step 4: the RN respectively receives the {PRB 6, PRB 7} and {PRB 8, PRB 9} in the RN-specific search space $S_1^{(2)}$, and then performs FFTs and blind detection respectively, if there is a RN ID matching with the RN, step 5 is performed; if there is not a RN ID matching with this RN, it indicates that there is no downlink control information related to this RN in the subframe.

Step 5: the RN demodulates the corresponding service information according to the instructions in its own control information after acquiring the control information born in the R-PDCCH.

Application example 5: based on the index of the PRB, the specific detection steps when applying the explicit notification are as follows:

At the eNB side, 1) the eNB sets the index of the PRB of each RNs which belongs to this eNB as a fixed value, such as, the index of the PRB of the PRB occupied by the RN1 is 5, the indexes of the PRB occupied by the RN2 are 7 and 8, and so on. Besides, the indexes of the PRB occupied by all the RNs are not overlapped.

2) When the RN initially accesses the eNB, the eNB notifies the RN of the index of the PRB in the message 2 of the random access or the higher layer signaling. For example, the total number of PRBs in the 20 MHz system bandwidth is 100, in which 10 PRBs are used for the R-PDCCH transmission, when applying the bitmap way, it needs 10 bits to notify the index of the PRB; when applying the improved tree structure way, it only needs $\lceil \log_2(2N_{RB}^{BL}-1) \rceil = \lceil \log_2(2 \times 10-1) \rceil = 5$ bits.

At the RN side, 1) when using the bitmap way, the RN determines its own PRB index according to the received 10 bits bitmap pattern. For example, the index of the PRB occupied by the RN1 is 5, and the bitmap pattern received by the RN should be 0000010000; the indexes of the PRB occupied by the RN2 are 7 and 8, and the bitmap pattern received by the RN should be 0000000110;

2) when using the improved tree structure way, the RN can acquire which PRBs are occupied by its R-PDCCH specifically in accordance with the 5 bits information in the message 2 or the higher layer signaling and various PRB aggregation levels denoted by used bits which are appointed by the RN and the eNB.

Application example 6: the R-PBCH is used to semi-statically notify its changes for the fixed PRB index.

The eNB and the RN pre-define various aggregation levels between the RN and the index of the PRB, such as, one aggregation level is: the index of the PRB of the RN1 is 1, the indexes of the PRB of the RN2 are 8 and 9, and the indexes of the PRB of the RN3 are 18 and 19; another aggregation level is: the indexes of the PRB of the RN1 are 49 and 50, the indexes of the PRB of the RN2 are 69 and 70, and the index of the PRB of the RN3 is 90; and so on.

When it needs to change the aggregation level, the eNB uses the R-PBCH to notify the RN that it changes into which aggregation level. The RN can also find its own starting PRB index according to the corresponding aggregation level.

In summary, the present invention is suitable for relay nodes quite well, it guarantees a lower complexity of the relay nodes detecting the downlink control information, and improves the overall system efficiency.

Certainly, the present invention can also have a variety of other embodiments, and those skilled in the art can make various corresponding modifications and transformations to the present invention without departing from the spirit and essence of the present invention, and all of such modifications or transformations should fall into the protection scope of the appended claims of the present invention.

INDUSTRIAL APPLICABILITY

The present invention takes full use of the good channel conditions of the backhaul link and greatly simplifies the complexity of the RN performing detection on the R-PDCCH. The present invention is suitable for the RN quite well, saves the system overhead and improves the system transmission efficiency.

What is claimed is:

1. A method for detecting downlink control information, the method comprising:

a relay node (RN) receiving downlink control information born in a relay physical downlink control channel (R-PDCCH) sent by an evolved Node B (eNB) to acquire a control resource; and the RN performing detection on the control resource according to an index of the control resource to acquire own control information;

wherein the control resource is a Relay Control Channel Element (R-CCE) or a Physical Resource Block (PRB);

the step of the RN performing detection on the control resource according to the index of the control resource to acquire own control information comprises:

said RN acquiring a RN-specific search space according to a RN identity, a subframe number of a backhaul subframe, an aggregation level of a CCE/PRBs and a number of candidate control channels/PRBs; and the RN performing blind detection on the R-CCEs/PRBs in the RN-specific search space, and if a R-CCE/PRB matching with an own RN identity is detected, the downlink control information born in the R-CCEs/PRBs being RN's own control information;

said RN-specific search space is:

$$L\{(Y_k+e) \bmod \lfloor N_k/L \rfloor\}+i$$

where, $L \in \{1,2,4,8\}$, $L \in \{1,2,4\}$, $L \in \{1,2\}$ or $L \in \{1\}$, and $i=0, \ldots, L-1$, $e=0, \ldots, E^{(L)}-1$, and $E^{(L)}$ is the number of candidate control channels/PRBs, and $N_k$ is a total number of R-CCEs for relay link transmission or a total number of PRBs semi-statically reserved by the eNB for the relay, $Y_k=(A*Y_{k-1}) \bmod D$, $Y_{-1}=n_{RNT1} \neq 0$, $A=39827$, $D=65537$, k is the subframe number of the backhaul subframe, and $n_{RNT1}$ is a RN identity index; the number of candidate control channels/PRBs is 6, 4 or 2;

the RN detects the downlink scheduling grant information (DL grant) in a $1^{st}$ slot and detects the uplink scheduling grant information (UL grant) in a $2^{nd}$ slot;

a DL grant specific search space and a UL grant specific search space of the RN are both calculated as an above formula, where, L values are same or different when calculating the DL grant specific search space and the UL grant specific search space of the RN.

2. The method of claim 1, wherein, when the control resource is transmitted on the R-CCE, the R-PDCCH of said RN is interleaved together, and the step of the RN receiving the downlink control information born in the R-PDCCH sent by the eNB to acquire the control resource comprises:

said RN receiving the downlink control information born in the R-PDCCH sent by the eNB on a group of PRBs or PRB pairs semi-statically reserved by the eNB for the relay, and performing Fast Fourier Transform (FFT) and de-interleaving to acquire a plurality of R-CCEs.

3. The method of claim 2, wherein, when the control resource is transmitted on the R-CCE, DL grants of the RN are interleaved with each other, and the UL grants of the RN are interleaved with each other;

the step of the RN receiving the downlink control information born in the R-PDCCH sent by the eNB to acquire the control resource further comprises:

the RN receiving an interleaved DL grant in a first slot of a group of PRB pairs semi-statically reserved by the eNB for the relay, performing fast Fourier transform (FFT) and de-interleaving to acquire a plurality of R-CCEs$_{DL\ grant}$;

receiving an interleaved UL grant in a second slot of a group of PRB pairs semi-statically reserved by the eNB for the relay, performing fast Fourier transform (FFT) and de-interleaving to acquire a plurality of R-CCEs$_{UL\ grant}$; and the RN performing detection on a DL grant search space and a UL grant search space respectively.

4. The method of claim 1, wherein, when the control resource is transmitted on the aggregation of one or more PRBs, the R-PDCCHs of various RN are not interleaved with each other, and the step of the RN receiving the downlink control information born in the R-PDCCH sent by the eNB to acquire the control resource comprises:

said RN receiving the downlink control information born in the R-PDCCH sent by the eNB on one or more PRB pairs of a group of PRB pairs semi-statically reserved by the eNB for the relay and performing Fast Fourier Transform (FFT) to acquire a plurality of PRBs.

5. The method of claim 4, wherein, when the control resource is transmitted on the aggregation of one or more PRBs, the R-PDCCHs of various RN are not interleaved with each other, and the RN has a specific PRB, the step of the RN receiving the downlink control information born in the R-PDCCH sent by the eNB to acquire the control resource further comprises:

said RN receiving a DL grant in a first slot of one or more PRB pairs semi-statically reserved by the eNB for the relay, and receiving a UL grant in a second slot; and the RN performing detection on a DL grant search space and a UL grant search space respectively.

6. The method of claim 1, wherein, the step of the RN performing detection on the control resource according to the index of the control resource comprises:

the eNB notifying the index of the control resource of the R-PDCCH of the RN via broadcast signaling, higher layer signaling or message 2 in a random access process, and further performing detection on the control resource corresponding to the index of the control resource; and the eNB notifying respective indexes of a DL grant and a UL grant of the RN via broadcast signaling, higher layer signaling or the message 2 in the random access process, and further performing detection on the control resource corresponding to the respective indexes of the DL grant and the UL grant.

7. The method of claim 6, wherein, the eNB notifies the index of the control resource of the R-PDCCH of the RN via a bitmap; or, the eNB notifies the index of the control resource of the R-PDCCH of the RN via a tree structure.

8. The method of claim 6, wherein, the step of the RN performing detection on the control resource according to the index of the control resource comprises: appointing various aggregation levels between the RN and the index of the control resource via the eNB and the RN, and further performing detection on the control resource corresponding to the index of the control resource.

9. The method of claim 8, wherein, the eNB notifies a change of the aggregation level between the RN and the index of the control resource via a broadcast channel of the RN.

10. A device for detecting downlink control information, which is applied in a relay node, and the device comprising a receiving unit and a detecting unit, wherein the receiving unit is configured as: receiving control information born in a relay physical downlink control channel (R-PDCCH) sent by an evolved Node B (eNB) in a group of physical resource blocks (PRB) semi-statically reserved by the eNB for relay to acquire a control resource;

the detecting unit is configured as: performing detection on the control resource acquired by the receiving unit according to an index of the control resource to acquire downlink control information of the RN;

wherein the control resource is based on a R-CCE or a PRB;

the detecting unit is configured as: performing detection on the control resource acquired by the receiving unit according to an index of the control resource to acquire downlink control information of the RN by:

acquiring a RN-specific search space according to a RN identity, a subframe number of a backhaul subframe, an aggregation level of a CCE/PRBs and a number of candidate control channels/PRBs; and performing blind detection on the R-CCEs/PRBs in the RN-specific search space, and if a R-CCE/PRB matching with an own RN identity is detected, the downlink control information born in the R-CCEs/PRBs being RN's own control information;

said RN-specific search space is:

$L\square\{(Y_k+e) \bmod \lfloor N_k/L \rfloor\}+i$ where, $L \in \{1,2,4,8\}$, $L \in \{1,2,4\}$, $L \in \{1,2\}$ or $L \in \{1\}$, and $i=0, \ldots, L-1$, $e=0, \ldots, E^{(L)}-1$, and $E^{(L)}$ is the number of candidate control channels/PRBs, and $N_k$ is a total number of R-CCEs for relay link transmission or a total number of PRBs semi-statically reserved by the eNB for the relay, $Y_k(A*Y_{k-1}) \bmod D$, $Y_{-1}=n_{RNT1} \neq 0$, $A=39827$, $D=65537$, k is the subframe number of the backhaul subframe, and $n_{RNT1}$ is a RN identity index; the number of candidate control channels/PRBs is 6, 4 or 2;

the detecting unit detects the downlink scheduling grant information (DL grant) in a $1^{st}$ slot and detects the uplink scheduling grant information (UL grant) in a $2^{nd}$ slot;

a DL grant specific search space and a UL grant specific search space of the RN are both calculated as an above formula, where, L values are same or different when calculating the DL grant specific search space and the UL grant specific search space of the RN.

11. The device of claim 10, wherein,
the receiving unit is configured as: receiving the control information born in the R-PDCCH sent by the eNB on a group of PRBs or PRB pairs semi-statically reserved by the eNB for the relay, and performing Fast Fourier Transform (FFT) and de-interleaving to acquire a plurality of R-CCEs;

receiving an interleaved DL grant in a $1^{st}$ slot of a group of PRB pairs semi-statically reserved by the eNB for the relay, and receiving an interleaved UL grant in a $2^{nd}$ slot of a group of PRB pairs semi-statically reserved by the eNB for the relay.

12. The device of claim 10, wherein,
the receiving unit is also configured as: receiving the control information born in the R-PDCCH sent by the eNB on a group of PRBs or PRB pairs semi-statically reserved by the eNB for the relay;

receiving a DL grant in a first slot of one or more PRB pairs semi-statically reserved by the eNB for the relay, and receiving a UL grant in a second slot.

13. The device of claim 10, wherein,
the detecting unit is also configured as: further performing detection on the control resource corresponding to the index of the control resource according to the index of the control resource of the R-PDCCH of the RN notified by the eNB via broadcast signaling, higher layer signaling or message 2 in a random access process; and further performing detection on the control resource corresponding to respective indexes of a DL grant and a UL grant the eNB according to respective indexes of the DL grant and the UL grant of the RN notified by the eNB via broadcast signaling, higher layer signaling or the message 2 in the random access process.

14. The device of claim 10, wherein,
the detecting unit is also configured as: appointing various aggregation levels between the RN and the index of the control resources via the eNB and the RN, and further performing detection on the control resources corresponding to the index of the control resources.

* * * * *